(12) United States Patent
Zhou et al.

(10) Patent No.: US 12,254,372 B2
(45) Date of Patent: Mar. 18, 2025

(54) CARD READER PART

(71) Applicants: NIDEC SANKYO CORPORATION, Nagano (JP); NIDEC SANKYO (ZHEJIANG) CORPORATION, Zhejiang Province (CN)

(72) Inventors: Haiqin Zhou, Zhejiang Province (CN); Ryo Uchiyama, Nagano (JP)

(73) Assignees: NIDEC SANKYO CORPORATION, Nagano (JP); NIDEC SANKYO (ZHEJIANG) CORPORATION, Zhejiang Province (CN)

( * ) Notice: Subject to any disclaimer, the term of this patent is extended or adjusted under 35 U.S.C. 154(b) by 0 days.

(21) Appl. No.: 18/155,748

(22) Filed: Jan. 18, 2023

(65) Prior Publication Data

US 2023/0237286 A1    Jul. 27, 2023

(30) Foreign Application Priority Data

Jan. 27, 2022   (CN) .......................... 202210102447.4

(51) Int. Cl.
*G06K 7/00*          (2006.01)
(52) U.S. Cl.
CPC .................................. *G06K 7/0047* (2013.01)
(58) Field of Classification Search
CPC ................................................... G06K 7/0047
USPC .......................................................... 235/441
See application file for complete search history.

(56) References Cited

U.S. PATENT DOCUMENTS

| | | | |
|---|---|---|---|
| 3,836,753 A * | 9/1974 | Pass ..................... | G06K 13/073 235/475 |
| 2011/0006118 A1* | 1/2011 | Mizawa ............. | G06K 13/0875 235/483 |
| 2017/0193253 A1* | 7/2017 | Willis ..................... | G07F 11/04 |

* cited by examiner

*Primary Examiner* — Michael G Lee
*Assistant Examiner* — David Tardif
(74) *Attorney, Agent, or Firm* — JCIPRNET

(57) ABSTRACT

Provided is a card reader part. The card reader part has a shell inside which a card carrying passage for carrying a card in a first direction perpendicular to a thickness direction of the card and a carrying mechanism are disposed, the card carrying passage has an opening provided at an end face of the shell on one side in the first direction where a bezel with a card inlet and outlet is mounted, a pressing part is disposed inside the shell, the pressing part abuts against the card from one side in a second direction perpendicular to the thickness direction of the card and the first direction, and in an entire preset region of the card carrying passage from the opening to the other side in the first direction with respect to the opening, the pressing part is provided so as to be separated from the card.

9 Claims, 6 Drawing Sheets

CARD READER PART

CROSS REFERENCE TO RELATED APPLICATION

The present invention claims priority under 35 U.S.C. § 119 to Chinese Application No. 202210102447.4, filed Jan. 27, 2022, and the entire content of which is incorporated herein by reference.

BACKGROUND

Field of the Invention

At least an embodiment of the present invention relates to a card reader part.

Description of the Related Documents

In the past, there was a card reader, which includes a card reader part and a bezel. The card reader part has a shell, a card carrying passage for carrying a card in a first direction perpendicular to a thickness direction (consistent with a vertical direction) of the card and a carrying mechanism for carrying the card in the first direction are provided inside the shell, the card carrying passage is opened at an end face of the shell on one side in the first direction where the bezel can be mounted, and the bezel has a card inlet and outlet and can stably hold a discharged card at the card inlet and outlet.

In practice, it is sometimes desirable (for example, when the above-mentioned card reader is applied to a card issuing apparatus) that cards discharged from the card reader can drop continuously. In this case, it can be considered to remove the bezel and use the card reader part alone.

On the other hand, in the above-mentioned card reader, it is sometimes desirable that the card in the card carrying passage can be smoothly pulled out from the opening of the card carrying passage. Thus, a pressing part may be disposed inside the shell. The pressing part is located on one side in a second direction perpendicular to the thickness direction of the card and the first direction with respect to the card carried in the card carrying passage, and abuts against the card from the side in the second direction. However, in this case, even if the bezel is removed and the card reader part is used alone, the card, the inner end of which (i.e., the end on the inner side of the card carrying passage) is discharged to the vicinity of the opening of the card carrying passage, is sometimes caught by the pressing part and is not easy to drop.

SUMMARY

At least an embodiment of the present invention is accomplished in view of the above problems and provides a card reader part which helps to balance the smooth pulling-out of a card from an opening of a card carrying passage and the easy dropping of the card from the opening of the card carrying passage.

At least an embodiment of the present invention provides a card reader part having a shell inside which a card carrying passage configured for carrying a card in a first direction perpendicular to a thickness direction of the card and a carrying mechanism configured for carrying the card in the first direction are disposed, the card carrying passage having an opening provided at an end face of the shell on one side in the first direction where a bezel is mounted, the bezel having a card inlet and outlet, wherein a pressing part is disposed inside the shell, the pressing part is configured to abut against the card carried in the card carrying passage from one side in a second direction perpendicular to the thickness direction of the card and the first direction, and in an entire preset region of the card carrying passage from the opening to the other side in the first direction with respect to the opening, the pressing part is provided so as to be separated from the card in the entire preset region.

According to the card reader part of at least an embodiment of the present invention, a pressing part is disposed inside the shell, and the pressing part abuts against the card carried in the card carrying passage from one side in the second direction perpendicular to the thickness direction of the card and the first direction, so the pressing part can be easily used to ensure the smooth pulling-out of the card from the opening of the card carrying passage; and in the entire preset region of the card carrying passage from the opening to the other side in the first direction with respect to the opening, the pressing part is provided so as to be separated from the card in the preset region, that is, provided so as not to contact with the card in the preset region. Therefore, in the case where the card reader part is disposed in such a manner that the thickness direction of the card carried in the card carrying passage is consistent with the vertical direction, only the inner end of the card (i.e., the end on the inner side of the card carrying passage) is discharged to the vicinity of the opening of the card carrying passage on one side in the first direction by means of the carrying mechanism, and the card can easily drop due to its own weight.

In addition, in the card reader part of at least an embodiment of the present invention, a notch for preventing the pressing part from contacting the card is provided at a position where the pressing part overlaps the entire preset region in the first direction.

According to the card reader part of at least an embodiment of the present invention, a notch for preventing the pressing part from contacting the card is provided at a position where the pressing part overlaps the preset region in the first direction, so the pressing part is easily and reliably prevented from contacting the card, the inner end of which (i.e., the end on the inner side of the card carrying passage) is discharged to the vicinity of the opening of the card carrying passage on one side in the first direction, thereby ensuring more reliable dropping of the card.

In addition, in the card reader part of at least an embodiment of the present invention, the pressing part has an elongated body extending in the first direction, and the notch is provided at an end of the elongated body on one side in the first direction.

According to the card reader part of at least an embodiment of the present invention, the pressing part has an elongated body extending in the first direction, so the pressing part can be easily used to ensure the smooth pulling-out of the card from the opening of the card carrying passage.

In addition, in the card reader part of at least an embodiment of the present invention, the carrying mechanism includes a first pressing roller and a first pad roller which are located in a vicinity of the opening of the card carrying passage on one side in the first direction and are opposite in the thickness direction so as to clamp the card carried in the card carrying passage from two sides in the thickness direction, and the entire preset region extends from the opening toward the other side in the first direction to a place where the first pressing roller and the first pad roller are closest to each other in the thickness direction, or extends to a position on the other side in the first direction with respect to the place.

According to the card reader part of at least an embodiment of the present invention, the carrying mechanism includes a first pressing roller and a first pad roller which are located in a vicinity of the opening of the card carrying passage on one side in the first direction and are opposite in the thickness direction so as to clamp the card carried in the card carrying passage from two sides in the thickness direction, and the preset region extends from the opening toward the other side in the first direction to a place where the first pressing roller and the first pad roller are closest to each other in the thickness direction, or extends to a position on the other side in the first direction with respect to the place, so the carrying mechanism can discharge the card to a position where the inner end of the card is on the other side in the first direction with respect to the preset region, and the pressing part can be easily used to ensure the smooth pulling-out of the card from the opening of the card carrying passage; on the other hand, the carrying mechanism can discharge the card to a position where the inner end of the card is on the other side in the first direction with respect to the place, so the card can drop more reliably.

In addition, in the card reader part of at least an embodiment of the present invention, the carrying mechanism includes a first pressing roller and a first pad roller which are located in a vicinity of the opening of the card carrying passage on one side in the first direction and are opposite in the thickness direction so as to clamp the card carried in the card carrying passage from two sides in the thickness direction, a first sensor is further provided inside the shell at a position on one side in the first direction with respect to a place where the first pressing roller and the first pad roller are closest to each other in the thickness direction, and the first sensor is configured to detect presence or absence of the card.

According to the card reader part of at least an embodiment of the present invention, the carrying mechanism includes a first pressing roller and a first pad roller which are located in a vicinity of the opening of the card carrying passage on one side in the first direction and are opposite in the thickness direction so as to clamp the card carried in the card carrying passage from two sides in the thickness direction, a first sensor is disposed inside the shell at a position on one side in the first direction with respect to the place where the first pressing roller and the first pad roller are closest to each other in the thickness direction, and the first sensor detects the presence or absence of a card, so even if the card, the inner end of which (i.e., the end on the inner side of the card carrying passage) is discharged to the vicinity of the opening of the card carrying passage on one side in the first direction, does not drop from the opening, this situation can be easily grasped according to the detection result of the first sensor, thereby avoiding adverse effects caused by non-dropping of the card.

In addition, in the card reader part of at least an embodiment of the present invention, a second sensor is further provided inside the shell at a position on the other side in the first direction with respect to the place where the first pressing roller and the first pad roller are closest to each other in the thickness direction and close to the opening of the card carrying passage on one side in the first direction, and the second sensor is configured to detect presence or absence of the card.

According to the card reader part of at least an embodiment of the present invention, a second sensor is disposed inside the shell at a position on the other side in the first direction with respect to the place where the first pressing roller and the first pad roller are closest to each other in the thickness direction and close to the opening of the card carrying passage on one side in the first direction, and the second sensor detects the presence or absence of a card, so it can be grasped more reliably according to the detection result of the first sensor and the detection result of the second sensor that the card, the inner end of which (i.e., the end on the inner side of the card carrying passage) is discharged to the vicinity of the opening of the card carrying passage on one side in the first direction, does not drop from the opening, thereby avoiding adverse effects caused by non-dropping of the card more reliably.

In addition, in the card reader part of at least an embodiment of the present invention, the pressing part is movable in the second direction, and a force applying part is further provided inside the shell, and the force applying part is configured to press the pressing part toward the other side in the second direction.

According to the card reader part of at least an embodiment of the present invention, the pressing part is movable in the second direction, and a force applying part is disposed inside the shell to press the pressing part toward the other side in the second direction, so a card can be easily inserted into the card carrying passage and the card in the card carrying passage can be held more stably by means of the pressing part.

In addition, in the card reader part of at least an embodiment of the present invention, the pressing part has an elongated body extending in the first direction and a rod portion extending in the thickness direction from two sides of the elongated body in the first direction, a notch is provided at an end of the elongated body on one side in the first direction, the pressing part is separated from the card in the entire preset region in the second direction at the notch, and a guide portion configured for guiding the rod portion to move in the second direction is further provided inside the shell.

According to the card reader part of at least an embodiment of the present invention, the pressing part has an elongated body extending in the first direction and a rod portion extending in the thickness direction from two sides of the elongated body in the first direction, and a guide portion for guiding the rod portion to move in the second direction is disposed inside the shells, so the pressing part can be easily used to hold the card carrying passage more stably; in addition, a notch is provided at an end of the elongated body on one side in the first direction, and the pressing part is separated from the card in the preset region in the second direction at the notch, so the pressing part is easily and reliably prevented from contacting the card, the inner end of which (i.e., the end on the inner side of the card conveying passage) is discharged to the vicinity of the opening of the card conveying passage on one side in the first direction, thereby ensuring more reliable dropping of the card.

In addition, in the card reader part of at least an embodiment of the present invention, the notch overlaps in the thickness direction the rod portion on one side of the elongated body in the first direction when viewed in the second direction.

Further, in the card reader part of at least an embodiment of the present invention, the force applying part is configured to apply force to the elongated body at a plurality of positions spaced apart in the first direction, and the force applying part is a spring.

According to the card reader part of at least an embodiment of the present invention, the force applying part applies force to the elongated body at multiple positions spaced apart in the first direction, so the part can be pressed and held more stably and then the card in the card carrying passage can be held more stably; and the force applying part is a spring, which can reduce the manufacturing cost of the force applying part.

In addition, in the card reader part of at least an embodiment of the present invention, the card carrying passage is provided such that its size in the thickness direction is larger in a vicinity of the opening as one side in the first direction is closer to the opening.

According to the card reader part of at least an embodiment of the present invention, the card carrying passage is provided such that, in a vicinity of the opening, the closer the side facing the opening in the first direction is, the larger the size in the thickness direction is, so the card, the inner end of which (i.e., the end on the inner side of the card conveying passage) is discharged to the vicinity of the opening of the card conveying passage on one side in the first direction, is more likely to drop.

(Technical Effect)

According to at least an embodiment of the present invention, a pressing part is disposed inside the shell, and the pressing part abuts against the card carried in the card carrying passage from one side in the second direction perpendicular to the thickness direction of the card and the first direction, so the pressing part can be easily used to ensure the smooth pulling-out of the card from the opening of the card carrying passage; and in the entire preset region of the card carrying passage from the opening to the other side in the first direction with respect to the opening, the pressing part is provided so as to be separated from the card in the preset region, that is, provided so as not to contact with the card in the preset region. Therefore, in the case where the card reader part is disposed in such a manner that the thickness direction of the card carried in the card carrying passage is consistent with the vertical direction, only the inner end of the card (i.e., the end on the inner side of the card carrying passage) is discharged to the vicinity of the opening of the card carrying passage on one side in the first direction by means of the carrying mechanism, and the card can easily drop due to its own weight.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

Hereinafter, a card receiving and dispatching device including a card reader part according to an embodiment of the present invention will be described with reference to FIG. 1.

Here, for the convenience of description, three directions orthogonal to each other are set as X direction, Y direction and Z direction, and one side of X direction is set as X1, the other side of X direction is set as X2, one side of Y direction is set as Y1, the other side of Y direction is set as Y2, one side of Z direction is set as Z1, and the other side of Z direction is set as Z2.

(Overall Structure of Card Receiving and Dispatching Device)

Figure 1:
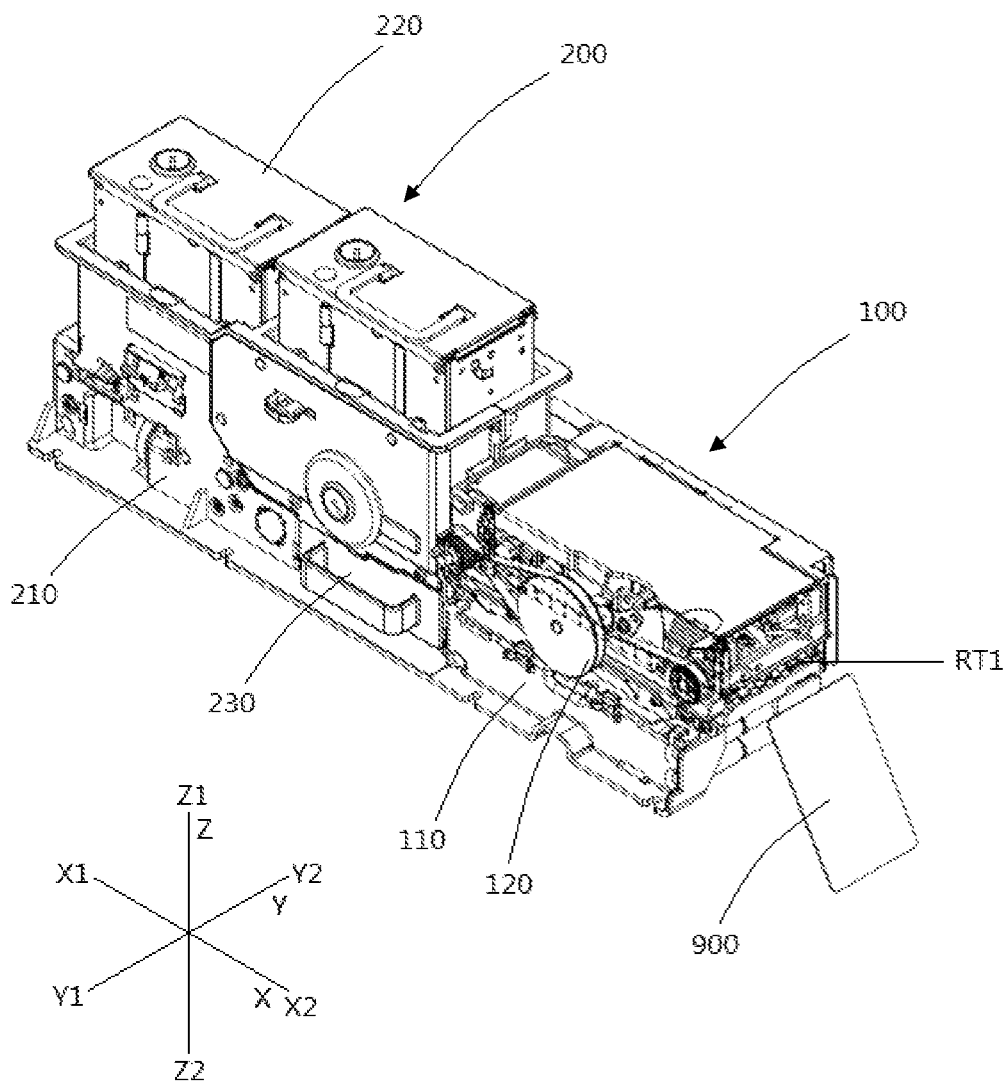
FIG. 1 is a perspective view schematically showing a card receiving and dispatching device including a card reader part according to an embodiment of the present invention, in which a card drops from an opening of a card carrying passage.

As shown in FIG. 1, the card receiving and dispatching device 1 includes a card reader part 100 and a card storage unit 200, the card reader part 100 reads and/or writes a card 900 (e.g., a chip card, a rectangular card with a bar code, etc.) through a communication portion (e.g., a metal terminal and a magnetic head, etc.), the card storage unit 200 stores the card 900 and is connected to the card reader part 100, and the card reader part 100 delivers the card 900 stored in the card storage unit 200 out from an opening RT1 described below, or recovers the discarded card 900 to the card storage unit 200.

(Structure of Card Reader Part)

Figure 2:
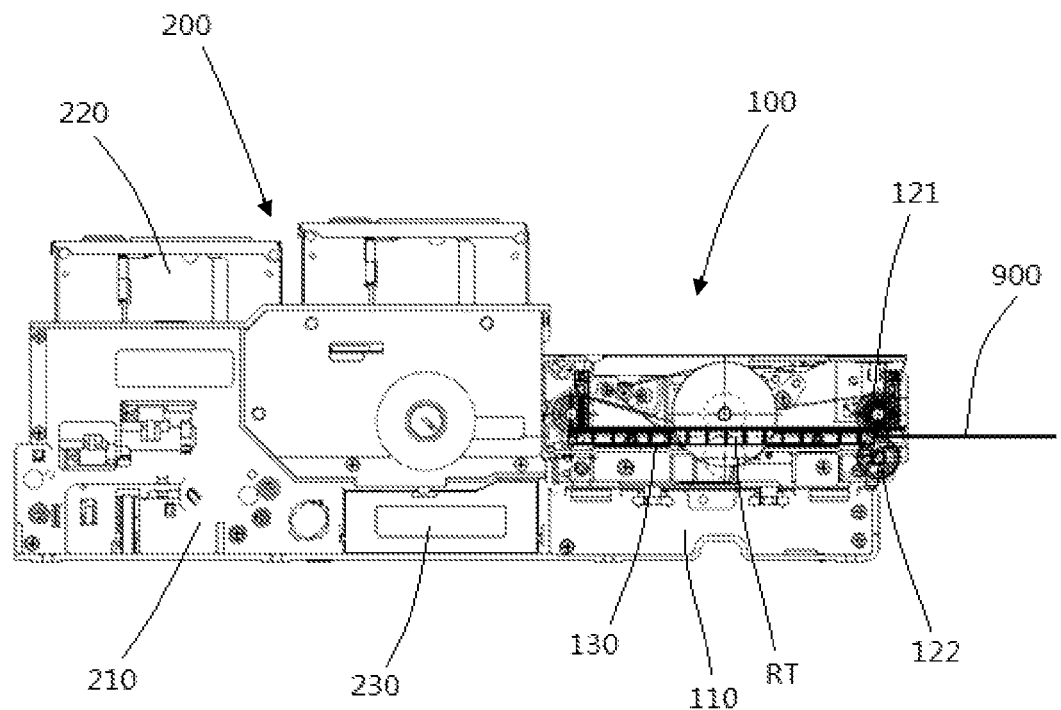
FIG. 2 is a side view schematically showing the card receiving and dispatching device including the card reader part according to an embodiment of the present invention, in which the relative positions of a pressing part, a first pressing roller and a first pad roller in a shell and the case where a card is discharged from the opening of the card carrying passage are shown.
Figure 2:
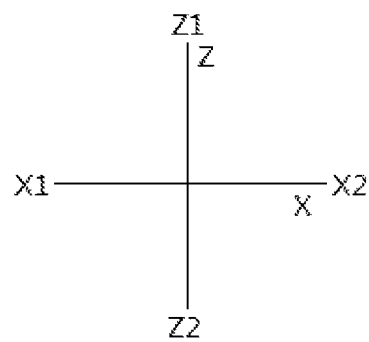

As shown in FIG. 1 and FIG. 2, the card reader part 100 has a shell 110, a card carrying passage RT for carrying a card 900 in an X direction (equivalent to a first direction in the present application) perpendicular to a thickness direction (consistent with the Z direction in the illustrated example, for example, consistent with the vertical direction) of the card 900 and a carrying mechanism 120 for carrying the card in the X direction are disposed inside the shell 110, and the card carrying passage RT has an opening at an end face of the shell 110 on the X2 direction side (equivalent to one side in the first direction) in the X direction where a bezel 300 (see FIG. 6) having a card inlet and outlet 301 can be mounted, that is, the card carrying passage RT has an opening RT1 at an end face of the shell 110 on the X2 direction side. Further, as shown in FIG. 2, a pressing part 130 (for the convenience of description, the originally invisible pressing part 130 is shown in FIG. 2) is disposed inside the shell 110. The pressing part 130 is located on the Y1 direction side (equivalent to one side in the second direction) in the Y direction (equivalent to the second direction) with respect to the card 900 carried in the card carrying passage RT, and abuts against the card 900 from the Y1 direction side. Further, as shown in FIG. 2 and FIG. 3, in an entire preset region PT of the card carrying passage RT from the opening RT1 to the X1 direction side (i.e., the other side in the first direction) with respect to the opening RT1, the pressing part 130 is provided so as to be separated from the card 900 in the preset region PT.

Here, as shown in FIG. 1 and FIG. 2, the entire shell 110 is in a substantially rectangular shape, and the opening RT1 provided at the end face of the shell 110 on the X2 direction side is in the shape of a strip extending in the Y direction.

Figure 3:
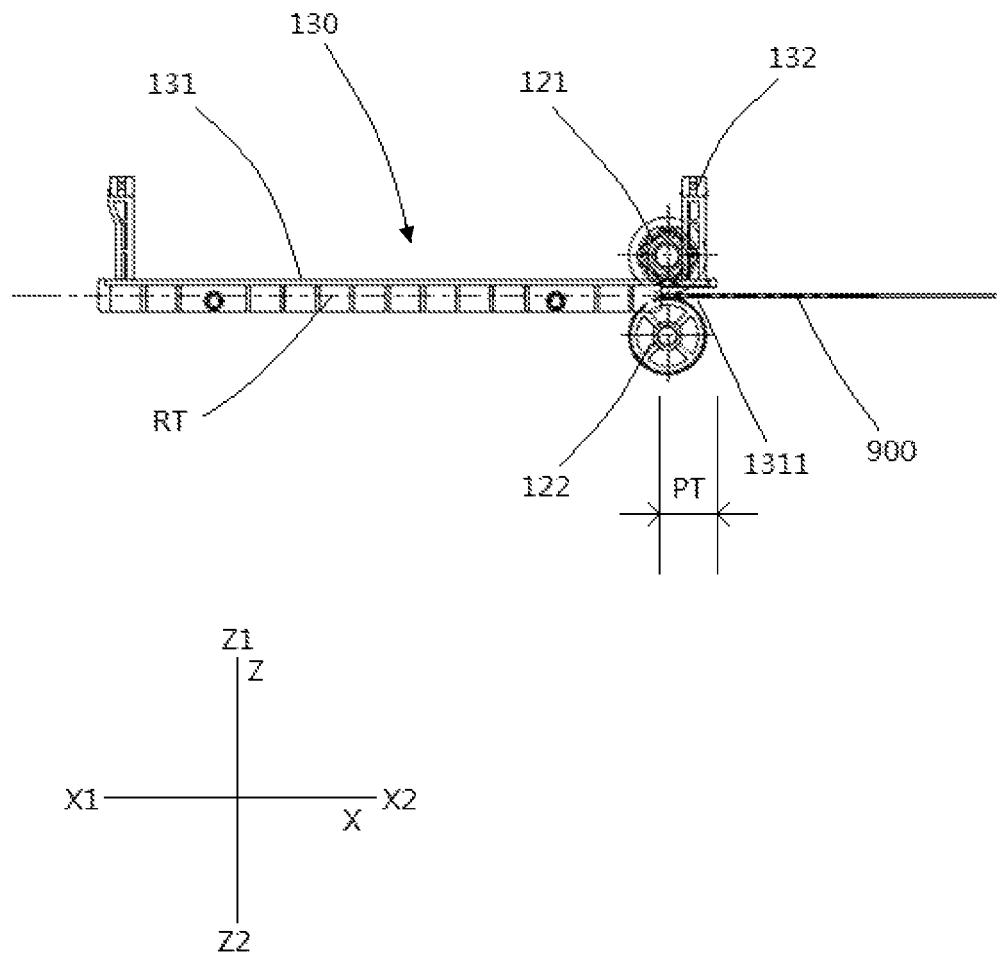
FIG. 3 is a side view of the pressing part, the first pressing roller and the first pad roller in FIG. 2 and a card that are separately drawn out.

In addition, as shown in FIG. 2 and FIG. 3, the carrying mechanism 120 includes a first pressing roller 121 and a first pad roller 122 (the surfaces of the first pressing roller 121 and the first pad roller 122 are made of rubber, for example), and the first pressing roller 121 and the first pad roller 122 are located in a vicinity of the opening RT1 of the card carrying passage RT on the X2 direction side and are opposite in the thickness direction of the card 900 so as to clamp the card 900 carried in the card carrying passage RT from two sides in the thickness direction of the card 900. In addition, the preset region PT extends from the opening RT1 toward the X1 direction side to a place where the first pressing roller 121 and the first pad roller 122 are closest to each other in the thickness direction of the card 900, or extends to a position on the X1 direction side with respect to the place. A first sensor (not shown) is disposed inside the shell 110 at a position on the X2 direction side with respect to the place where the first pressing roller 121 and the first pad roller 122 are closest to each other in the thickness direction of the card 900, and the first sensor detects the presence or absence of a card 900. A second sensor (not shown) is disposed inside the shell 110 at a position on the other side in the X1 direction with respect to the place where the first pressing roller 121 and the first pad roller 122 are closest to each other in the thickness direction of the card 900 and close to the opening RT1 of the card carrying passage RT, and the second sensor detects the presence or absence of a card 900.

Moreover, the carrying mechanism 120 further includes a driving source (such as a motor, not shown) that drives the first pressing roller 121 to rotate forward or reverse via a pulley or the like, thus carrying the card 900 inserted into the card carrying passage RT toward the X1 direction side (i.e., the inner side of the card carrying passage RT) or discharging the card 900 in the card carrying passage RT toward the X2 direction side.

In addition, the carrying mechanism 120 may further include a second pressing roller and a second pad roller which are located in a vicinity of the X1 direction side of the card carrying passage RT (i.e., the inner side of the card carrying passage RT), for example, the second pressing roller is driven by the driving source to rotate forward or reverse, thus carrying the card 900 inserted into the card carrying passage RT toward the X1 direction side (i.e., the inner side of the card carrying passage RT) or discharging the card 900 in the card carrying passage RT toward the X2 direction side.

Figure 4:
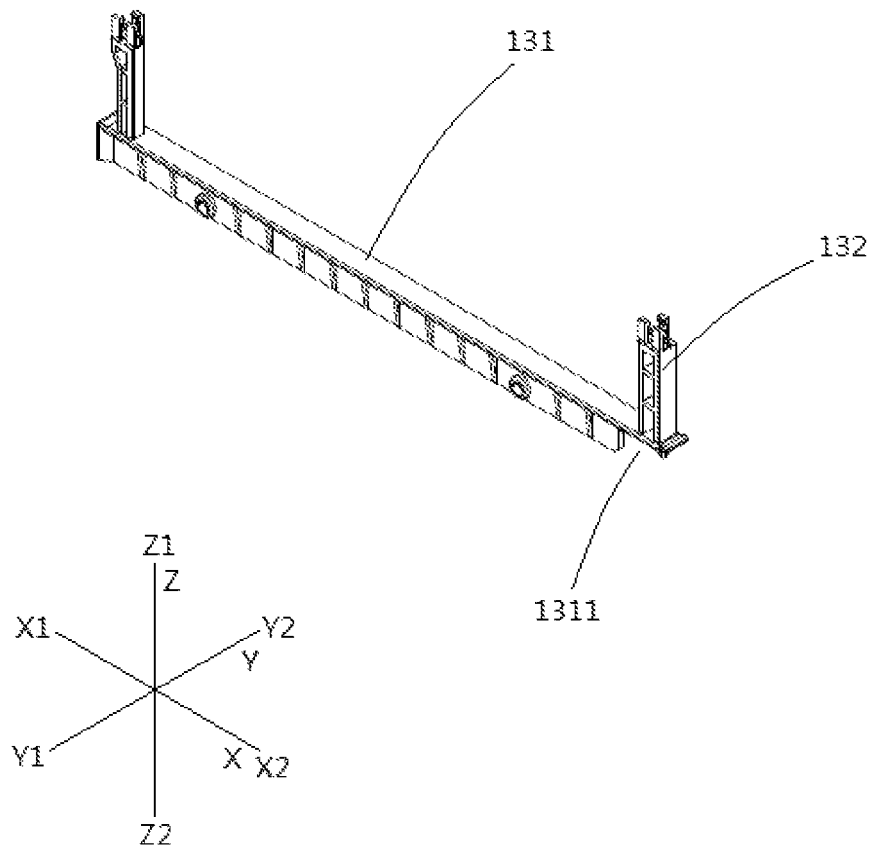
FIG. 4 is a perspective view schematically showing the pressing part in the card reader part according to an embodiment of the present invention.
Figure 5:
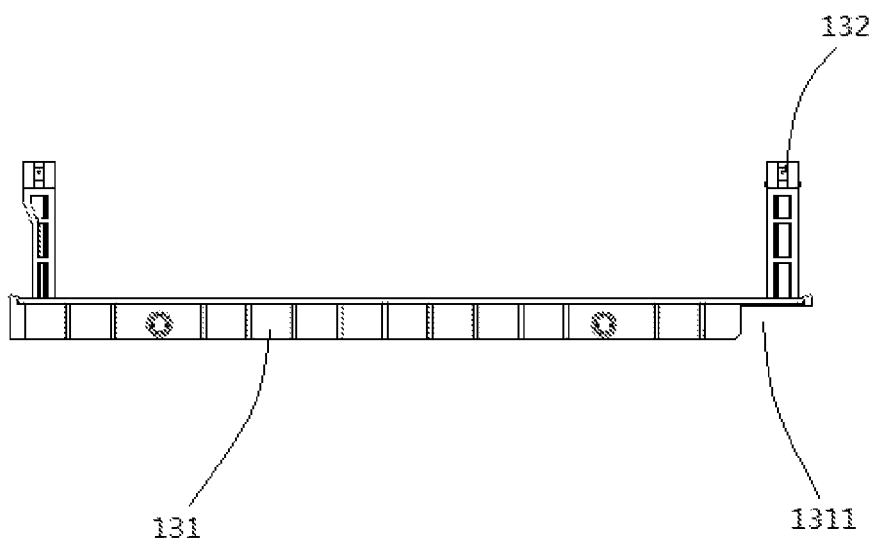
FIG. 5 is a side view schematically showing the pressing part in the card reader part according to an embodiment of the present invention.
Figure 5:
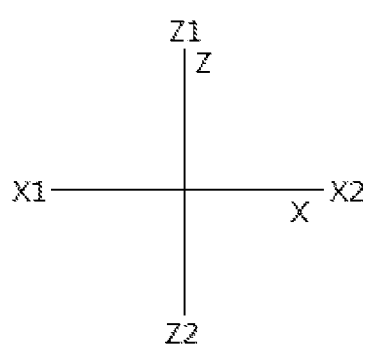

Further, the pressing part 130 is made of resin, for example. Further, as shown in FIG. 3 to FIG. 5, a notch 1311 for preventing the pressing part 130 from contacting the card 900 is provided at a position where the pressing part 130 overlaps the preset region PT in the X direction. Specifically, the pressing part 130 has an elongated body 131 extending in the X direction (in the illustrated example, a plurality of ribs extending in the Z direction are disposed at intervals in the X direction of the elongated body 131), and a rod portion 132 extending in the thickness direction (Z1 direction in the illustrated example) of the card 900 from two sides of the elongated body 131 in the X direction (in the illustrated example, a plurality of grooves are disposed at intervals in the Z direction of the rod portion 132). The notch 1311 is provided at an end of the elongated body 131 on the X2 direction side, and the pressing part 130 is separated from the card 900 in the preset region PT at the notch 1311. Further, a guide portion (not shown) for guiding the rod portion 132 to move in the Y direction is disposed inside the shell 110. When viewed in the Y direction, the notch 1311 overlaps the rod portion 132 on the X1 direction side of the elongated body 131 in the thickness direction of the card 900.

Further, the pressing part 130 is movable in the Y direction. In addition, a force applying part (not shown) is disposed inside the shell 110 to press the pressing part 130 toward the Y2 direction side (equivalent to the other side in the second direction). The force applying part applies force to the elongated body 131 at multiple positions spaced apart in the X direction (i.e., a plurality of force applying parts are disposed at intervals in the X direction). The force applying part may be a spring.

In addition, the card carrying passage RT is formed such that its size in the thickness direction of the card 900 is larger in a vicinity of the opening RT1 as the other side X2 in the X direction is closer to the opening RT1.

(Structure of Card Storage Unit)

As shown in FIG. 1 and FIG. 2, the card storage unit 200 has a base 210 connected to the shell 110 of the card reader part 100, and a first card box 220 and a second card box 230 which can be assembled and disassembled with respect to the base 210. For example, the first card box 220 is used for storing new cards 900, and the second card box 230 is used for storing discarded cards 900.

Here, as shown in FIG. 1 and FIG. 2, the end face of the base 210 on the X2 direction side is in contact with the end face of the shell 110 of the card reader part 100 on the X1 direction side. The first card box 220 is disposed on the Z1 direction side of the base 210 so as to be detachable with respect to the base 210 in the Z direction. Two first card boxes 220 are disposed, and an opening for a card 900 to enter and exit is disposed on the Z2 direction side of the wall of each of the two first card boxes 220 on the X2 direction side. In the two first card boxes 220, the bottom of the first card box 200 on the X2 direction side (i.e., the end on the Z2 direction side) is closer to the Z2 direction side than the bottom of the first card box 200 on the X1 direction side. A carrying mechanism, for example, is disposed inside the base 210, and the carrying mechanism can carry the card 900 stored in the first card box 220 to the card carrying passage RT in the shell 110 of the card reader part 100 through the opening of the first card box 220.

Further, as shown in FIG. 1 and FIG. 2, the second card box 230 is disposed on the Z2 direction side of the base 210 so as to be detachable with respect to the base 210 in the Y direction. One second card box 230 is disposed, overlaps the first card box 220 on the X2 direction side in the two first card boxes 220 in the Z direction, and is located below the first card box 220 on the X2 direction side. An opening for a card 900 to enter and exit is provided on the Z1 direction side of the second card box 230, so as to receive a card 900 (for example, a discarded card) carried by the card reader part 100 via the card carrying passage RT.

(Main Effect of this Embodiment)

According to the card receiving and dispatching device 1 of this embodiment, a pressing part 130 is disposed inside the shell 110 of the card reader part 100, and the pressing part 130 is located on the Y1 direction side (equivalent to one side in the second direction) in the Y direction (equivalent to the second direction) with respect to a card 900 carried in the card carrying passage RT, and abuts against the card 900 from the Y1 direction side, so the pressing part 130 can be easily used to ensure the smooth pulling-out of the card 900 from the opening RT1 of the card carrying passage RT; and in the entire preset region PT of the card carrying passage RT from the opening RT1 to the X1 direction side (equivalent to the other side in the first direction) in the X direction (equivalent to the first direction) with respect to the opening RT1, the pressing part 130 is provided so as to be separated from the card 900 in the preset region PT, that is, provided so as to contact a portion of the card 900 in a region beyond the preset region PT of the card carrying passage RT, but not to contact a portion of the card 900 in the preset region PT. Therefore, in the case where the card reader part 100 is disposed in such a manner that the thickness direction of the card 900 carried in the card carrying passage RT is consistent with the vertical direction, only the inner end of the card 900 (i.e., the end on the inner side of the card carrying passage RT) is discharged to the vicinity of the opening RT1 of the card carrying passage RT on the X2 direction side by means of the carrying mechanism 120, and the card 900 can easily drop due to its own weight.

At least an embodiment of the present invention is illustrated above with reference to the accompanying drawings. It is apparent that the specific implementation of at least an embodiment of the present invention is not limited by the foregoing embodiment.

Figure 6:
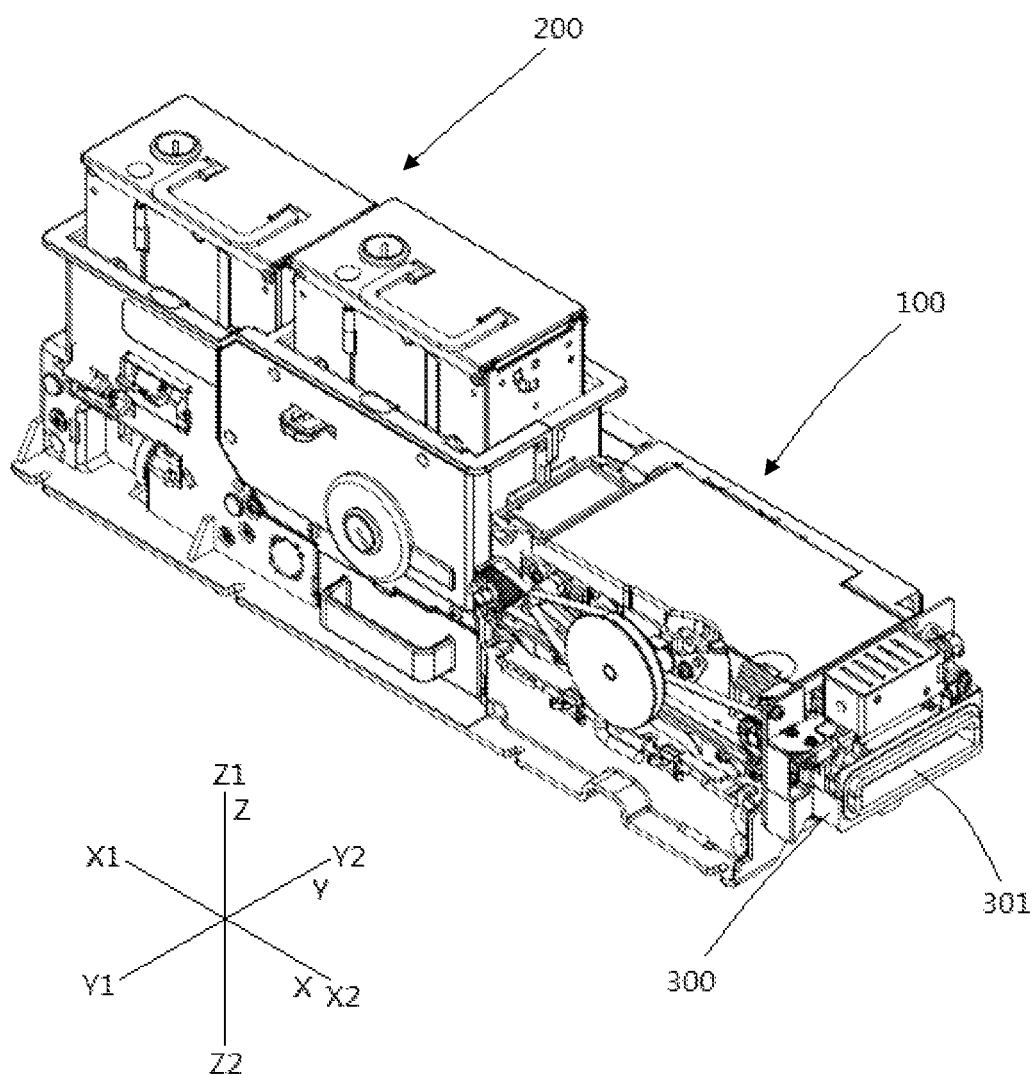
FIG. 6 is a perspective view schematically showing that a bezel with a card inlet and outlet is mounted at the opening of the card carrying passage of the card receiving and dispatching device in FIG. 1.

For example, in the foregoing embodiment, as shown in FIG. 6, a bezel 300 having a card inlet and outlet 301 may be mounted at an end of the card reader part 100 on the X2 direction side.

Further, in the foregoing embodiment, the card reader part 100 is used with the card storage unit 200 but is not limited thereto and the card reader part 100 may be used alone.

Further, in the foregoing embodiment, a notch 1311 for preventing the pressing part 130 from contacting the card 900 is provided at a position where the pressing part 130 overlaps the preset region PT when viewed in the Y direction, but it is not limited thereto, and a recess recessed toward the Y1 direction side may be provided at a position where the pressing part 130 overlaps the preset region PT in the X direction to replace the notch 1311.

Further, in the foregoing embodiment, the pressing part 130 has an elongated body 131 extending in the X direction and a rod portion 132 extending in the thickness direction of the card 900 from two sides of the elongated body 131 in the X direction, but it is not limited thereto, the shape of the pressing part 130 may be appropriately set as required, for example, the rod portion 132 may be omitted, and in this case, the guide portion for guiding the rod portion 132 may be omitted.

Further, in the foregoing embodiment, a first sensor and a second sensor for detecting the presence or absence of a card 900 are disposed inside the shell 110 but are not limited thereto and the first sensor and/or the second sensor may be omitted.

Further, in the foregoing embodiment, a plurality of force applying parts formed by springs are disposed inside the shell 110 at intervals in the X direction, but are not limited thereto. For example, the force applying parts may be made of elastic rubber, or only one force applying part may be disposed.

Further, a force applying part that presses the pressing part 130 toward the Y2 direction side is disposed inside the shell 110, but is not limited thereto, and the force applying part may be omitted depending on the case.

Further, in the foregoing embodiment, the card carrying passage RT is provided such that its size in the thickness direction of the card 900 is larger in a vicinity of the opening RT1 as the X2 direction side in the X direction is closer to the opening RT1, but it is not limited thereto, and the card carrying passage RT may also be provided such that its size in the thickness direction of the card 900 is constant in a vicinity of the opening RT1.

It should be understood that, within the scope of at least an embodiment of the present invention, various parts in the embodiments can be freely combined or appropriately modified or omitted.

What is claimed is:

1. A card reader part, having a first direction, a second direction, and a vertical direction perpendicular with each other, comprising:
   a shell;
   a card carrying passage, disposed inside the shell and configured for carrying a card in the first direction perpendicular to a thickness direction of the card, wherein the thickness direction of the card carried in the card carrying passage is consistent with the vertical direction;
   a carrying mechanism, disposed inside the shell and configured for carrying the card in the first direction, the card carrying passage having an opening provided at an end face of the shell on one side in the first direction where a bezel is mounted, the bezel having a card inlet and outlet; and
   a pressing part, disposed inside the shell and configured to abut against the card carried in the card carrying passage from one side in the second direction perpendicular to the thickness direction of the card and the first direction, wherein
   in an entire preset region of the card carrying passage from the opening to the other side in the first direction with respect to the opening, the pressing part is provided so as to be separated from the card in the entire preset region,
   wherein
   the carrying mechanism comprises a first pressing roller and a first pad roller,
   the first pressing roller and the first pad roller are located in a vicinity of the opening and are opposite in the thickness direction so as to clamp the card carried in the card carrying passage from two sides in the thickness direction, and
   the entire preset region extends from the opening toward the other side in the first direction to a place where the first pressing roller and the first pad roller are closest to each other in the thickness direction or extends to a position on the other side in the first direction with respect to the place.

2. The card reader part according to claim 1, wherein a notch for preventing the pressing part from contacting the card is provided at a position where the pressing part overlaps the entire preset region in the first direction.

3. The card reader part according to claim 2, wherein the pressing part has an elongated body extending in the first direction, and the notch is provided at an end of the elongated body on one side in the first direction.

4. The card reader part according to claim 1, wherein the carrying mechanism comprises a first pressing roller and a first pad roller,
the first pressing roller and the first pad roller are located in a vicinity of the opening and are opposite in the thickness direction so as to clamp the card carried in the card carrying passage from two sides in the thickness direction, and a first sensor is further provided inside the shell at a position on one side in the first direction with respect to a place where the first pressing roller and the first pad roller are closest to each other in the thickness direction, and the first sensor is configured to detect presence or absence of the card.

5. The card reader part according to claim 4, wherein a second sensor is further provided inside the shell at a position on the other side in the first direction with respect to the place where the first pressing roller and the first pad roller are closest to each other in the thickness direction and close to the opening, and the second sensor is configured to detect presence or absence of the card.

6. The card reader part according to claim 1, wherein the pressing part is movable in the second direction, a force applying part is further provided inside the shell, and the force applying part is configured to press the pressing part toward the other side in the second direction.

7. The card reader part according to claim 6, wherein the pressing part comprises:

an elongated body, extending in the first direction; and
a rod portion, extending in the thickness direction from two sides of the elongated body in the first direction, wherein
a notch is provided at an end of the elongated body on one side in the first direction,
the pressing part is separated from the card in the entire preset region in the second direction at the notch, and
a guide portion configured for guiding the rod portion to move in the second direction is further provided inside the shell.

8. The card reader part according to claim 7, wherein the force applying part is configured to apply force to the elongated body at a plurality of positions spaced apart in the first direction, and the force applying part is a spring.

9. The card reader part according to claim 1, wherein the card carrying passage is provided such that its size in the thickness direction is larger in a vicinity of the opening as one side in the first direction is closer to the opening.

* * * * *